J. BROPSON.
RESILIENT WHEEL.
APPLICATION FILED JAN. 8, 1916.

1,245,184.

Patented Nov. 6, 1917.

Witnesses:
H. J. Gettins.
B. C. Brown.

Inventor:
James Bropson
by Lynch & Dent
his Attorneys.

UNITED STATES PATENT OFFICE.

JAMES BROPSON, OF CLEVELAND, OHIO.

RESILIENT WHEEL.

1,245,184.   Specification of Letters Patent.   Patented Nov. 6, 1917.

Application filed January 3, 1916. Serial No. 70,897.

*To all whom it may concern:*

Be it known that I, JAMES BROPSON, a citizen of the United States of America, residing at Cleveland, in the county of Cuyahoga and State of Ohio, have invented certain new and useful Improvements in Resilient Wheels; and I hereby declare the following to be a full, clear, and exact description of the invention, such as will enable others skilled in the art to which it pertains to make and use the same.

This invention relates to new and useful improvements in wheels.

The object of this invention is to provide new and improved means for mounting a solid rubber tire on a wheel which will hold the tire firmly in place, which will readily admit of the removal and replacing of the tire or a section thereof when worn.

A further object of my invention is to provide in a wheel of this character new and improved means for preventing the wheel from skidding.

With these objects in view and with the intention of securing other advantages hereinafter appearing, this invention consists in certain features of construction and combinations of parts hereinafter described in the specification, pointed out in the claims and illustrated in the accompanying drawings.

Figure 1:
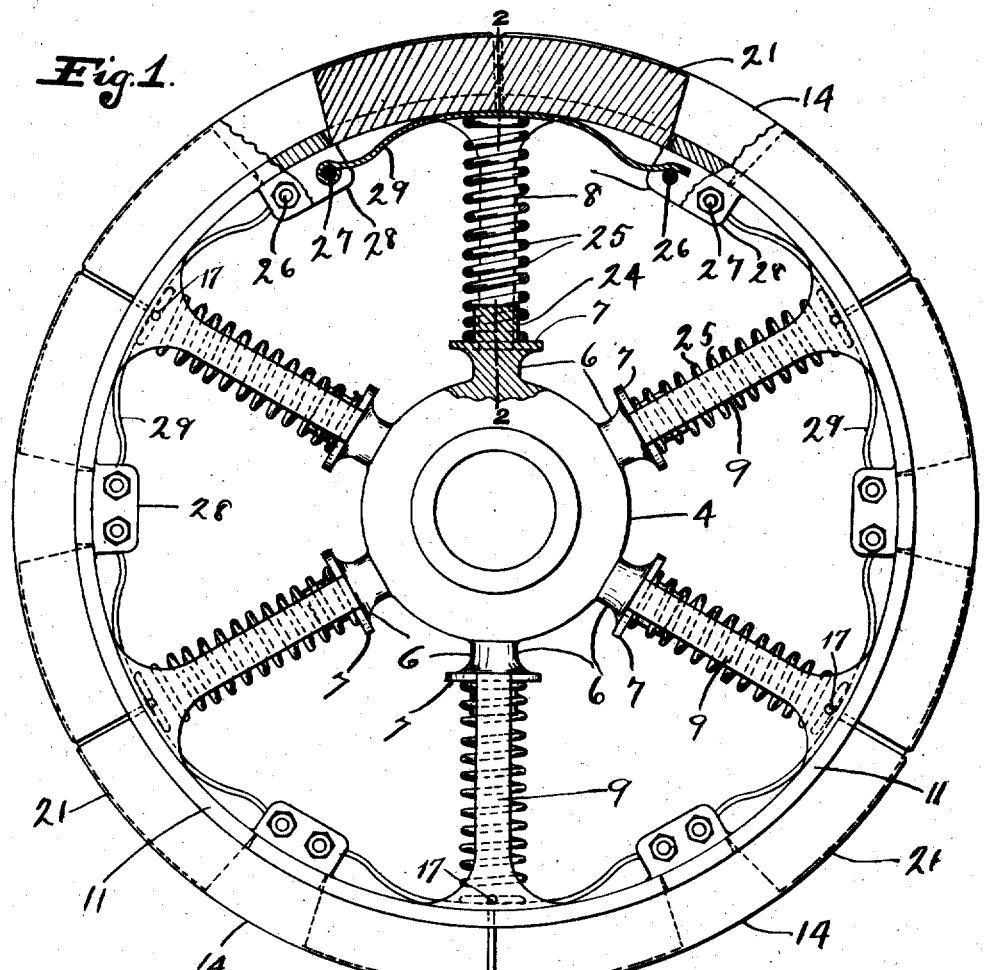
Figure 2:
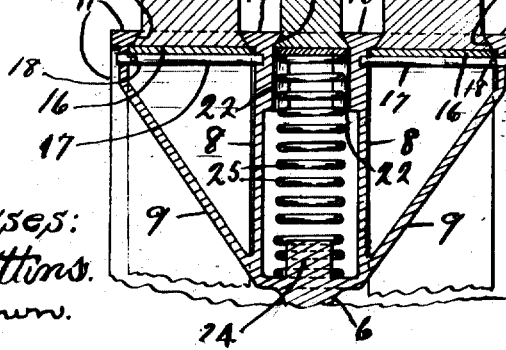

In the accompanying drawings, Figure 1 is a view in elevation, with a small part in section, of a wheel embodying my invention. Fig. 2 is a section on line 2—2, Fig. 1.

Again referring to the drawings, 4 represents the hub of the wheel. The spokes are preferably formed integral with the hub and each spoke comprises a shank portion 6, the outer end of which is circular in cross section and has a flat surface, as shown at 7. The spoke members are formed integral with the shank portion 6 and consist of two parallelly arranged flat bars 8 which extend from opposite sides of the shank portion 6 and two divergently arranged bars 9 which extend out from diametrically opposite sides of the shank portion and approximately from the same points as the parallelly arranged bars. The parallelly arranged spoke members or bars 8 are therefore arranged between the divergently arranged members or bars 9. The rim as shown is formed integral with the spoke members and comprises a centrally arranged band 10, which is supported on the parallelly arranged members of the spokes, and a pair of rings 11 one of which is arranged at each side of the band 10 and is spaced therefrom and said rings 11 are supported by the divergent members of the spokes. There is therefore formed in the rim, between each ring 11 and the band 10, a tire-receiving annular space or slot 12. The inner edges of the rings 11 and the edges of the band 10, which together of course form the edges of the tire-receiving slots 12, are beveled to provide a clencher arrangement as will hereinafter appear. The solid rubber tire sections are shown at 14 and are provided with beveled edges at their bases corresponding to the beveled edges of the tire receiving slots 12. On the inside of the rim at each side of the wheel is mounted a flexible strip 16 which is made wide enough to span the tire receiving slot 12. After the strip is inserted the ends are welded together forming a complete band, or, if desired, the ends of the strip may be lapped over each other. These bands 16 are supported by rods 17 which are mounted in the ends of the spoke members and the rods 17 are held against displacement by pins 18. When the rods 17 are driven into place the bands 16 are forced tightly against the bases of the solid rubber tire sections and the beveled edges of the tire sections are clamped against the beveled edges of the tire-receiving slots 12 so that the tire sections are securely held in place on the rim.

In the band 10 are formed a series of circumferentially extending slots 20, and there are preferably as many of these slots as there are spokes in the wheel, and each slot is arranged so that the center thereof is in line with the shank portion of the spoke. These slots 20 are primarily designed to receive non-skidding elements, shown at 21, which may be made of rubber, wood or metal, but may also be utilized for receiving additional solid rubber tire sections. The ends of the spokes 8 adjacent to the band 10 are slightly thickened, and the inner surfaces thereof are concave, as shown at 22, the two surfaces together forming a socket. At the center of the flat surface 7 on the shank portion 6 is formed a lug 24. One end of a coil spring 25 is arranged over the lug 24, and the other end thereof is inserted in the socket formed by the curved surfaces 22. On the inner face of the band 10 between the adjacent ends of the slots 20 are arranged bracket members 28 in which are mounted pins 26 and 27. One end of a bow spring 29 is secured to each pin 27, and the bow spring then passes over the end of a coil spring 25, and the other end of the bow spring rests freely on the pin 26 in the bracket member at the opposite end of the slot 20 under which said spring extends. The bow springs 29 therefore form bottom supports for the non-skidding elements 21, and in conjunction with the coil springs 25 hold the said non-skidding elements in position.

What I claim is:—

1. The combination of a wheel rim having three tire-receiving slots extending lengthwise around the same, and spokes supporting said rim, each spoke comprising a middle pair of radial parallel members supporting the middle part of the rim, and an outer pair of members diverging outwardly from the inner end of the spoke to the outer edges of said rim and supporting the outer edges of the rim, cushion tires in the two outer slots, and spring supported tread blocks in the middle slot.

2. The combination of a wheel rim, having a row of slots extending lengthwise around the same, spokes supporting the rim, tread blocks in the slots, flexible plates supported by the rim and bearing against the inner sides of the blocks, and springs in compression between the spokes and the plates.

3. The combination of a wheel rim having a row of slots extending lengthwise around the same, spokes supporting the rim, tread blocks extending through said slots, spring plates extending lengthwise behind the blocks and supported at their opposite ends on the rim, and coiled springs between the spokes and the middle part of the plates.

In testimony whereof, I sign the foregoing specification, in the presence of two witnesses.

JAMES BROPSON.

Witnesses:
VICTOR C. LYNCH,
B. C. BROWN.